United States Patent [19]

Beisch

[11] 3,860,295
[45] Jan. 14, 1975

[54] WHEEL TRIM [AND METHOD]
[75] Inventor: Hans R. Beisch, Amherstburg, Ontario, Canada
[73] Assignee: Norris Industries, Inc., Los Angeles, Calif.
[22] Filed: Sept. 27, 1972
[21] Appl. No.: 292,547

[52] U.S. Cl.................. 301/37 CM, 301/108 TW
[51] Int. Cl............................................. B60b 7/00
[58] Field of Search .............. 301/37 CM, 108 TW

[56] References Cited
UNITED STATES PATENTS
| | | | |
|---|---|---|---|
| 2,640,730 | 6/1953 | Lyon | 301/37 CM |
| 3,177,041 | 4/1965 | Isenbarger | 301/108 TW |
| 3,264,036 | 8/1966 | Wise | 301/37 CM |
| 3,337,271 | 8/1967 | Lyon | 301/37 CM |
| 3,432,206 | 3/1969 | Spisak | 301/37 CM |

Primary Examiner—Philip Goodman
Attorney, Agent, or Firm—Harness, Dickey & Pierce

[57] ABSTRACT

Novel wheel trim and method wherein a decorative plastic insert is securely and sealingly retained on a wheel cover by means of an annular flange on the cover overlapping the periphery of the insert. A resilient gasket is deformably sandwiched between the cover and the insert, thereby urging the insert against the flange and securely retaining and sealing the same on the cover. The outside diameter of the insert is temporarily reduced to facilitate assembly by bowing the insert utilizing a vacuum.

6 Claims, 4 Drawing Figures

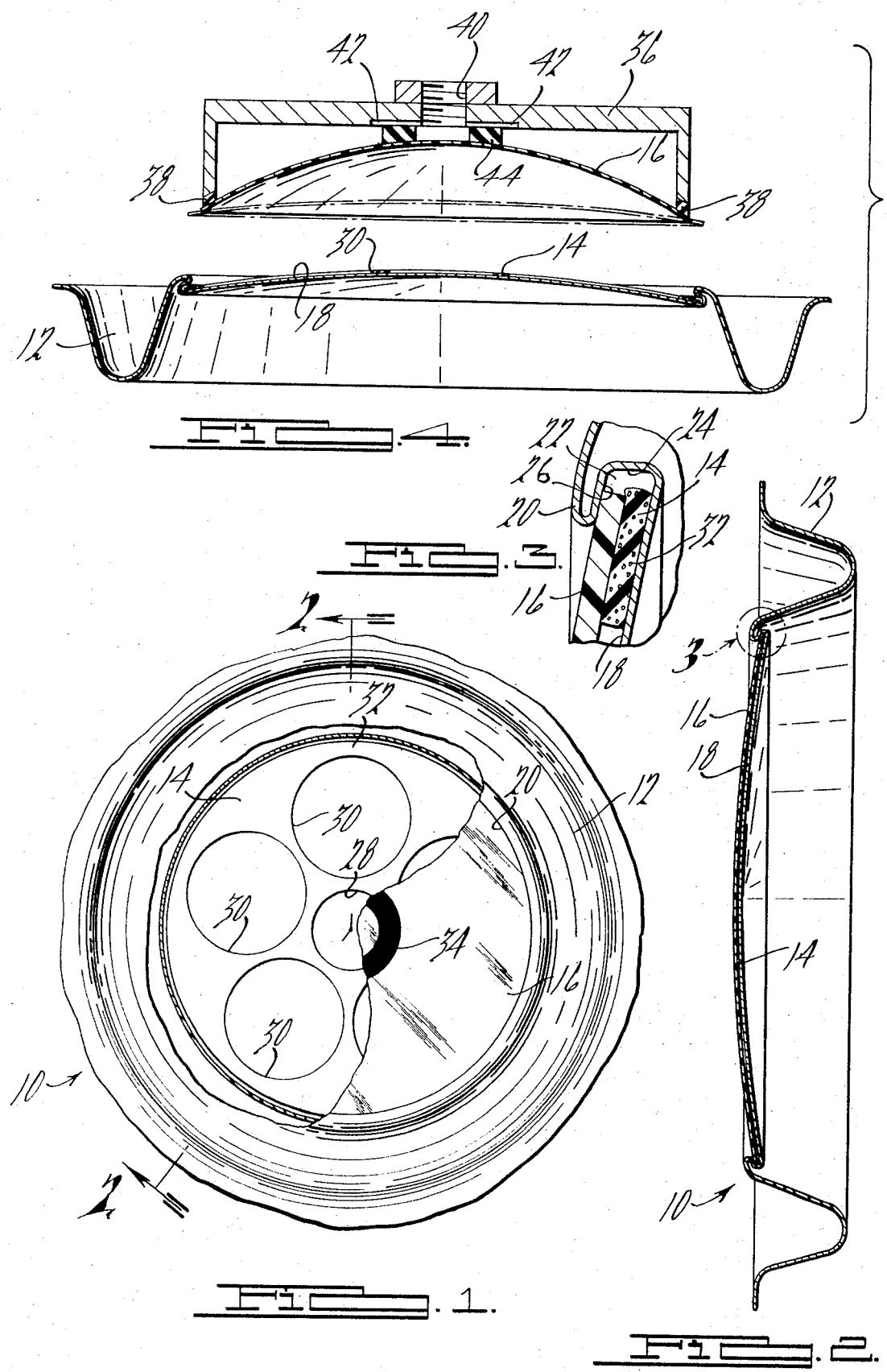

3,860,295

WHEEL TRIM [AND METHOD]

BACKGROUND AND SUMMARY OF THE INVENTION

The present invention relates to vehicle wheel trim and, in particular, to wheel trim of the type having a decorative insert mounted on a wheel cover, and a method of fabrication thereof. The invention is particularly suited to the use of plastic inserts on metal wheel covers.

Heretofore, in wheel trim of the type to which the present invention relates, various types of retention means have been utilized for retaining a decorative insert on a wheel cover. In one type, adhesive bonds the insert to the wheel cover; in another type, mechanical fasteners such as bendable tabs, screws, nuts, etc., are used; and in yet another type, an annular shoulder is mechanically formed over the periphery of the insert with the insert positioned on the cover. These prior retention means are unsatisfactory for one or more of the following reasons: in the course of use, the insert may work loose, thereby creating an annoying rattle or may even come off the cover entirely; assembly is expensive; adhesives and separate fasteners are themselves expensive; the back side of the insert may not be protected from foreign material which can intrude between the insert and its seat and harm the decorative appearance which is customarily imparted to the rear surface of a transparent plastic insert; the insert may be marred during assembly, especially if subjected to a press operation; the insert may be retained in a highly stressed condition, thereby rendering it susceptible to early failure when put into use; and, the cost of materials and fabrication may be relatively high. In the case of metal covers having plastic inserts, these problems are aggravated by the differences in the coefficient of thermal expansion of the two materials.

The prior art presently known to applicant is that found in a preliminary patentability search, the following U.S. Pat. Nos. having been found: 397,835, 799,922, 1,176,353, 2,640,730, 2,994,979, 3,287,067 and 3,337,271.

Among the objects of the present invention are to provide an improved wheel trim and method wherein: the insert may be expeditiously and reliably assembled to the wheel cover without separate attaching parts or adhesive; the back surface of the insert is protected from intrusion of foreign material, over a wide temperature range; the insert is not subject to damage during fabrication; the insert is securely and fixably retained on the wheel cover to preclude it from rattling, leaking or coming out in the course of use; over a wide temperature range; the insert may be retained on the wheel cover with the insert in a substantially unstressed condition; the insert is cushioned to reduce the possibility of breakage; and the wheel trim may be more economically constructed.

The foregoing objects, as well as additional objects, advantages and benefits of the present invention will be seen in the ensuing description and claims, which are to be taken in conjunction with the accompanying drawings.

BRIEF DESCRIPTION OF THE DRAWINGS

FIG. 1 is a plan view of an item of wheel trim (less retention) embodying the principles of the present invention;

FIG. 2 is an enlarged sectional view taken substantially along line 2—2 in FIG. 1;

FIG. 3 is an enlarged view taken in circle 3 of FIG. 2; and

FIG. 4 is a sectional view illustrating a method of assembly embodying the principles of the present invention.

The drawings illustrate preferred embodiments of the invention in accordance with the best mode presently contemplated for carrying out the invention.

DETAILED DESCRIPTION OF THE PREFERRED EMBODIMENTS

Wheel trim 10 according to the present invention, and the details thereof, are illustrated in FIGS. 1, 2 and 3. Wheel trim 10 generally comprises a formed metal wheel cover 12 having a suitable retention means around the periphery thereof (not shown) for mounting the same on the wheel of a vehicle, a gasket 14 and a decorative insert 16. Any known retention having the requisite characteristics may be utilized, in accordance with known principles.

Cover 12 has a central circular seat 18, the outer surface of which is of generally convex shape. An annular folded flange 20 is formed in cover 12 in any desired manner about the periphery of seat 18. Flange 20 extends generally radially inwardly and is spaced axially outwardly of the perimeter of seat 18 to provide a generally radially inwardly facing annular groove 22 around the seat, the bottom of the groove being indicated at 24. The axially outer surface of groove 22, indicated at 26, is generally parallel to the adjacent surface of seat 18.

Gasket 14 overlies the outer surface of seat 18 and comprises a relatively flat resilient circular disc having an outside diameter which is preferably slightly greater than the inside diameter of flange 20, a central opening 28 and a plurality of outwardly disposed circumferentially spaced openings 30. The outside diameter of the gasket is preferably not less than the outside diameter of insert 16, to alleviate centering problems during assembly, however in some applications the gasket may have a diameter that is even less than the inside diameter of the edge of flange 20. The center portion of gasket 14 prevents damaging contact between the central portion of seat 18 and the central portion of insert 16. Gasket 14 has a continuous outer annular portion, indicated at 32, which is disposed between the outer periphery of insert 16 and seat 18 in the manner to be described.

Insert 16 is provided primarily for decorative or ornamental purposes and is preferably fabricated from plastic. It is contemplated that it will preferably consist of a molded transparent plastic element having painted or coated on the concave face thereof suitable indicia, insignia, contrasting colors, or the like which will be viewable from the convex side thereof when assembled to a wheel cover. Suitable plastics include acrylics, which have excellent optical properties, polycarbonates, which are extremely hard and therefore resistant to marring or damage, and the like. If desired the concave surface of insert 16 may also be provided with embossed indicia or insignia, depending upon the ornamental effect desired. An exemplary insignia is indicated by a ring-like design at 34. Decorative materials other than plastic may also be used.

Insert 16 is formed with an outside diameter which is greater than the inside diameter of flange 20 and less than the inside diameter of bottom 24 of groove 22. This outside diameter is chosen so that it will meet these criteria for the full range of normally encountered temperature extremes, taking into account the great disparity in the coefficients of thermal expansion of the plastic of which the insert is formed and the material of which the cover is formed, preferably stainless steel or the like. Thus, the dimensions are so chosen that the insert will always be retained by the flange and yet will never be placed in a pinched or stressed condition by engagement of the bottom of groove 22 across a diameter thereof, which might cause it to buckle or fracture.

The thicknesses of gasket 14 and insert 16 are chosen relative to the axial dimension of groove 22 such that portion 32 of the gasket is compressed between the periphery of insert 16 and the periphery of seat 18, such compression existing throughout the full range of anticipated temperatures. Accordingly, gasket 14 resiliently urges the periphery of insert 16 against surface 26 of flange 20 to resiliently hold the insert in place. The resultant friction also prevents insert 16 from undesirable sliding with respect to the cover. Insert 16 need not necessarily be preformed to approximately the curvature of seat 18, and preferably has an unstressed radius of curvature greater than that of seat 18 so that the center thereof will tend to lie against the cover and the periphery thereof against surface 26. Holes 28 and 30 in gasket 14 provide spaces for the gasket to expand into when it is compressed between the insert and cover.

Gasket 14 is formed of any suitable elastomeric material which will retain its resiliency over the temperature ranges encountered, which will not react with the materials of the trim or normally encountered contaminants, and which is economical. For example, closed cell sponge rubber, rubber/cork compositions, rubber/fiber compositions, closed cell polyurethane foam, or the like may be used. It is contemplated that the gasket may be economically die cut from flat sheets of the gasket material. Since gasket 14 is deformably compressed, it also provides a leakproof seal between seat 18 and insert 16 around the peripheries thereof, which prevents foreign contaminants (such as water, road splash, salt spray, etc.) from intruding behind insert 16 and contacting the delicate decorated concave surface thereof. In this way, the decorative appearance on the rear face of the insert is impervious to even the most severe road conditions which may be encountered. Thus, gasket 14 performs the dual functions of retaining as well as sealing insert 16.

In accordance with another aspect of the present invention, an improved method of assembling insert 16 to cover 12 is illustrated in FIG. 4. Cover 12 is oriented preferably in a generally horizontal position and gasket 14 is laid on seat 18 as illustrated. Seat 18 is axially aligned with and beneath a circular suction cup or dome 36 having a resilient sealing lip 38 mounted around the peripheral edge thereof, the diameter of the latter being slightly less than the inside diameter of flange 20. The interior of dome 36 communicates via passageway 40 and grooves 42 to a source of vacuum.

An insert 16 is then centered on lip 38, as shown in phantom in FIG. 4, and vacuum is applied to the interior space between insert 16 and dome 36, causing insert 16 to deflect to the point that the entire periphery thereof is radially contracted an amount sufficient to permit the insert to pass through the opening defined by flange 20, as shown in solid lines in FIG. 4. A stop 44 may be provided within dome 36 so that insert 16 is always flexed to the proper shape, and not overstressed. With insert 16 so flexed, dome 36 and cover 12 (with gasket 14 in place) are moved together to position the insert against the gasket on seat 14. Passage 40 is then disconnected from the source of vacuum and vented or pressurized, thus permitting the insert to relax toward its unstressed shape with the outer periphery thereof moving radially outwardly into groove 22, where gasket 14 resiliently urges it against surface 24 to retain and seal the insert in place.

Thus, the invention provides for an econimical, reliable assembly of insert 16 to cover 12 without the use of separate attaching parts or bonding material. Moreover, the versatility of the invention makes it possible to use a relatively thin insert, and it is not necessary that the insert be preformed to a curvature approximating that of seat 18. In fact, with some materials insert 16 could be flat, with sufficient thinness to flex to the contour of seat 18 without becoming overstressed. The solid configuration of seat 18 strengthens and supports insert 16. Although the insert shown in circular in plan, the invention is also applicable to other shapes, as well as other sizes. In addition, it will be appreciated that numerous variations in the cross-sectional shape of the cover may be utilized.

Thus, there are disclosed in the above description and in the drawings embodiments of the invention which fully and effectively accomplish the objects thereof. However, it will be apparent that variations in the embodiments may be indulged in without departing from the sphere of the invention herein described, or the scope of the appended claims.

I claim:

1. Wheel trim for a vehicle wheel, comprising: a sheet metal cover member adapted to cover a portion of a wheel; means defining a generally circular seat on said cover member; a resilient gasket disposed on said seat and having an annular periphery whose overall diameter is slightly less than the diameter of said seat; a plastic insert member disposed on said gasket, said plastic insert member having a rear face engaging said gasket, a front face opposite said rear face and a free peripheral edge surface disposed therebetween; and annular retention flange means on said cover member having a generally axially extending surface spaced radially outwardly of said peripheral edge surface of said plastic insert member, said retention flange means further having a retaining surface overlying and engaging a peripheral portion of said front face of said plastic insert member, said retention flange means permitting relative radial displacement of said insert member on said seat, the spacing between said peripheral edge surface and said axially extending surface of said retention flange means being such that said plastic insert member is retained in a substantially unstressed condition in the radial direction in spite of thermal expansion and contraction of said cover member and said insert member.

2. Wheel trim as claimed in claim 1, wherein the front face of said second member is slightly convex.

3. Wheel trim as claimed in claim 1, wherein said seat, said peripheral portion of said front face and said retaining surface are generally parallel to one another.

4. Wheel trim for a vehicle wheel, comprising: cover means adapted to cover a portion of the axially outer face of a vehicle wheel; ornamental transparent plastic insert means having a given shape in plan and axially inner and outer faces with decorative indicia being provided on said axially inner face; and mounting and sealing means for mounting said insert means on the axially outer face of said cover means and for sealingly enclosing the inner face of said insert means to prevent intrusion of contaminants and the like onto the inner face of said insert means and thereby protect said indicia, said mounting and sealing means comprising, means defining a seat on the axially outer face of said cover means, said seat being of said given shape and slightly larger than said insert means, means defining a continuous retention flange on said cover means disposed about the outer periphery of said seat, the free edge of said flange being of said given shape and slightly smaller than said insert means, said seat extending under said flange and said plastic insert means being disposed with the radially outer periphery thereof positioned between said seat flange, and continuous resilient gasket means compressed between said seat and said outer periphery of said insert means such that said gasket means exerts a force on the outer periphery of said insert means substantially entirely in the direction of said retention flange, the resilient bias of said gasket providing a continuous seal between the inner face of said insert means and said seat and cooperating with said seat to enseal the inner face of said insert means around said indicia.

5. Wheel trim as claimed in claim 4, wherein the free shape of said insert means is substantially flat.

6. Wheel trim as claimed in claim 5, wherein the surface of said seat facing said insert means has a generally convex shape.

* * * * *